US012570476B2

(12) United States Patent
Ronchi

(10) Patent No.: US 12,570,476 B2
(45) Date of Patent: Mar. 10, 2026

(54) EXTRACTION SYSTEM FOR TRANSPORTING IN AN ADVANCING DIRECTION AN ORDERLY FLOW OF ARTICLES

(71) Applicant: RONCHI MARIO S.P.A., Gessate (IT)

(72) Inventor: Cesare Ronchi, Gessate (IT)

(73) Assignee: RONCHI MARIO S.P.A., Gessate (IT)

( * ) Notice: Subject to any disclaimer, the term of this patent is extended or adjusted under 35 U.S.C. 154(b) by 146 days.

(21) Appl. No.: 18/274,838

(22) PCT Filed: Feb. 23, 2022

(86) PCT No.: PCT/IB2022/051574
§ 371 (c)(1),
(2) Date: Jul. 28, 2023

(87) PCT Pub. No.: WO2022/180526
PCT Pub. Date: Sep. 1, 2022

(65) Prior Publication Data
US 2024/0101352 A1     Mar. 28, 2024

(30) Foreign Application Priority Data

Feb. 26, 2021     (IT) ........................ 102021000004619

(51) Int. Cl.
*B65G 33/06*     (2006.01)
*B65G 33/26*     (2006.01)
*B65G 33/36*     (2006.01)

(52) U.S. Cl.
CPC .......... *B65G 33/06* (2013.01); *B65G 33/265* (2013.01); *B65G 2201/0244* (2013.01)

(58) Field of Classification Search
CPC ...... B65G 33/06; B65G 33/26; B65G 33/265; B65G 33/36
USPC .......................................................... 198/625
See application file for complete search history.

(56) References Cited

U.S. PATENT DOCUMENTS

| | | | | |
|---|---|---|---|---|
| 3,841,946 | A * | 10/1974 | Carter ........................ | B65C 9/06 |
| | | | | 156/566 |
| 4,301,912 | A * | 11/1981 | Cooley .................. | B65G 47/71 |
| | | | | 198/625 |
| 4,526,128 | A * | 7/1985 | Sorace ................ | B05B 13/0221 |
| | | | | 118/313 |
| 4,658,708 | A * | 4/1987 | Rastoin ................ | A23G 3/2076 |
| | | | | 198/659 |
| 4,660,708 | A * | 4/1987 | Willerding ............ | B67C 7/0013 |
| | | | | 198/341.02 |
| 5,117,965 | A * | 6/1992 | Newell .................. | B65G 33/06 |
| | | | | 198/444 |
| 5,407,057 | A * | 4/1995 | Baranowski ......... | B65G 47/681 |
| | | | | 198/448 |
| 7,861,845 | B1 * | 1/2011 | Lapointe .............. | B65G 65/466 |
| | | | | 198/383 |
| 8,783,441 | B2 * | 7/2014 | Itoh ........................ | G01N 35/04 |
| | | | | 198/663 |

(Continued)

FOREIGN PATENT DOCUMENTS

WO      WO-2019082113 A1 *  5/2019  ............. B65G 54/02

*Primary Examiner* — Douglas A Hess

(57)     ABSTRACT

An extraction system for transporting in a longitudinal advancing direction (E) an orderly flow of articles, in particular containers (100), with a support plane (40), a first helical screw (10) and a second helical screw (20), for transporting an orderly flow of articles.

30 Claims, 6 Drawing Sheets

(56)         References Cited

U.S. PATENT DOCUMENTS

|  |  |  |  |  |
|---|---|---|---|---|
| 9,415,945 | B1 * | 8/2016 | Whitney | B65G 33/265 |
| 9,643,787 | B1 * | 5/2017 | Carteri | B65G 33/34 |
| 10,434,483 | B2 * | 10/2019 | Wenger | A23K 40/25 |
| 11,066,250 | B2 * | 7/2021 | Ronchi | B65G 47/901 |
| 11,186,444 | B2 * | 11/2021 | Ronchi | B25J 9/0096 |

* cited by examiner

EXTRACTION SYSTEM FOR TRANSPORTING IN AN ADVANCING DIRECTION AN ORDERLY FLOW OF ARTICLES

BACKGROUND OF THE INVENTION

The present invention relates to an extraction system for transporting an orderly flow of articles, such as containers, output from an unscrambling apparatus, as well as an unscrambling apparatus and an unscrambling method which use the extraction system.

It is known in the technical sector relating to the packaging of products, for example in liquid, fluid or powder form, that there exists the need to handle articles, in particular containers, such as bottles, flasks and the like, which have different capacities and forms and which are fed to automatic operating machines such as filling, capping and labelling machines designed to fill, close, label and subsequently forward the articles/products for packaging.

It is also known that these automatic machines are generally supplied with a continuous and orderly flow of articles, in particular arranged with a predefined uniform pitch (distance between two successive articles) and/or advancing at a predefined constant speed, these parameters being set depending on the requirements of said machines.

In addition, it may also be required that the containers should arrive at the automatic operating machines always in a certain—generally upright—position, i.e. with the filling opening directed upwards and/or with a specific orientation of its surfaces (conventionally identified as front, side or rear relative to a heightwise axis, the position of the filling mouth and/or the advancing direction through the machine), so as to allow correct handling of the article, for example necessary during the labelling operations.

For this purpose, feeding apparatus—conventionally called "unscrambling machines"—have been developed, these apparatus being able to feed articles such as containers—which are initially arranged randomly inside special hoppers—in an orderly sequence and with a predefined (e.g. upright) position and/or orientation to said downstream operating machines.

Examples of these unscrambling machines are described in WO 2019082113 A1, WO 2019082111 A1 and WO 2019082112 A1 in the name of the same present Applicant, which describe an unscrambling apparatus comprising a conveyor belt for conveying randomly arranged containers, which follows a substantially U-shaped path, and robots for picking up and releasing the articles, arranged and configured so as to pick up the articles arranged randomly on the conveyor belt and release them with a predefined orientation and/or position to an extraction system. The extraction system for extracting the containers is designed to receive the containers and extract them from the apparatus along an extraction direction, so that they are arranged with a predefined orientation and/or position which is generally dictated by the requirements of the operating machines situated downstream of the unscrambling machine. For this purpose, the extraction system uses a plurality of grippers for picking up the containers and transporting them on an extraction surface. The grippers are displaceable independently of each other and each comprise a pair of jaws.

Although this extraction system is versatile with regard to the management of different formats of articles and different orderly extraction flows, it has been noticed that the system with independent grippers according to the prior art is difficult to implement and control and is not always reliable at the high processing and extraction speed which are required for some types of containers.

The technical problem which is posed therefore is that of providing a system for the orderly transportation of articles, in particular containers, which is particularly suitable for use as an extraction system in unscrambling apparatus for extracting an orderly flow of articles to be fed to input devices of downstream operating machines, such as filling machines, capping machines or labelling machines, and which provides a solution to or at least partially overcomes one or more of the aforementioned problems of the prior art.

SUMMARY OF THE INVENTION

A particular object of the present invention is to provide a transport system for the orderly extraction of articles which is compact and reliable.

In connection with this technical problem, it is particularly desirable that the transport system should be able to be easily adapted to different formats of the articles and/or to different parameters required for the orderly flow of outgoing articles, such as in particular the pitch between the articles or the exit speed/flowrate.

A further desirable aspect is that the system should be easy and inexpensive to produce and assemble and be able to be easily installed at any user location; in particular it is preferable that that the extraction system should allow the use of simple and therefore fast pick and place robots, without affecting the unscrambling efficiency and/or may be easily used in unscrambling machines with a U-shaped conveyor belt.

A further desirable aspect is that the system should be able to transport an orderly flow of asymmetrical products which must be fed to the downstream operating machines with a certain predefined position and/or orientation.

These results are obtained according to the present invention by an extraction system for transporting an orderly flow of articles, by an apparatus for unscrambling articles, in particular containers, fed randomly, and by a method for unscrambling articles.

Preferred embodiments are described in the dependent claims which are cited herein.

In such an extraction system, in which two helical screws rotate alongside each other on parallel axes above a support plane, a plurality of containment spaces for containing and advancing an article on a transport plane are defined between the first helical screw and the second helical screw, said spaces being arranged in sequence in the longitudinal advancing direction E so that the rotation of the helical screws allows the advancing of an article from one space to the next space in the advancing direction, resulting in an orderly flow of articles which advance arranged in-line in the extraction direction with a desired advancing speed. The system is particularly compact and may be easily adjusted and adapted to different formats of articles, speeds and pitches of the flow of articles being extracted, as well as to different types of unscrambling machines.

BRIEF DESCRIPTION OF THE SEVERAL VIEWS OF THE DRAWINGS

Further details may be obtained from the following description of non-limiting examples of embodiment of the subject of the present invention provided with reference to the case where the articles to be sorted are containers, such as bottles containing a product, and to the attached drawings, in which.

DETAILED DESCRIPTION OF THE INVENTION

Figure 1:
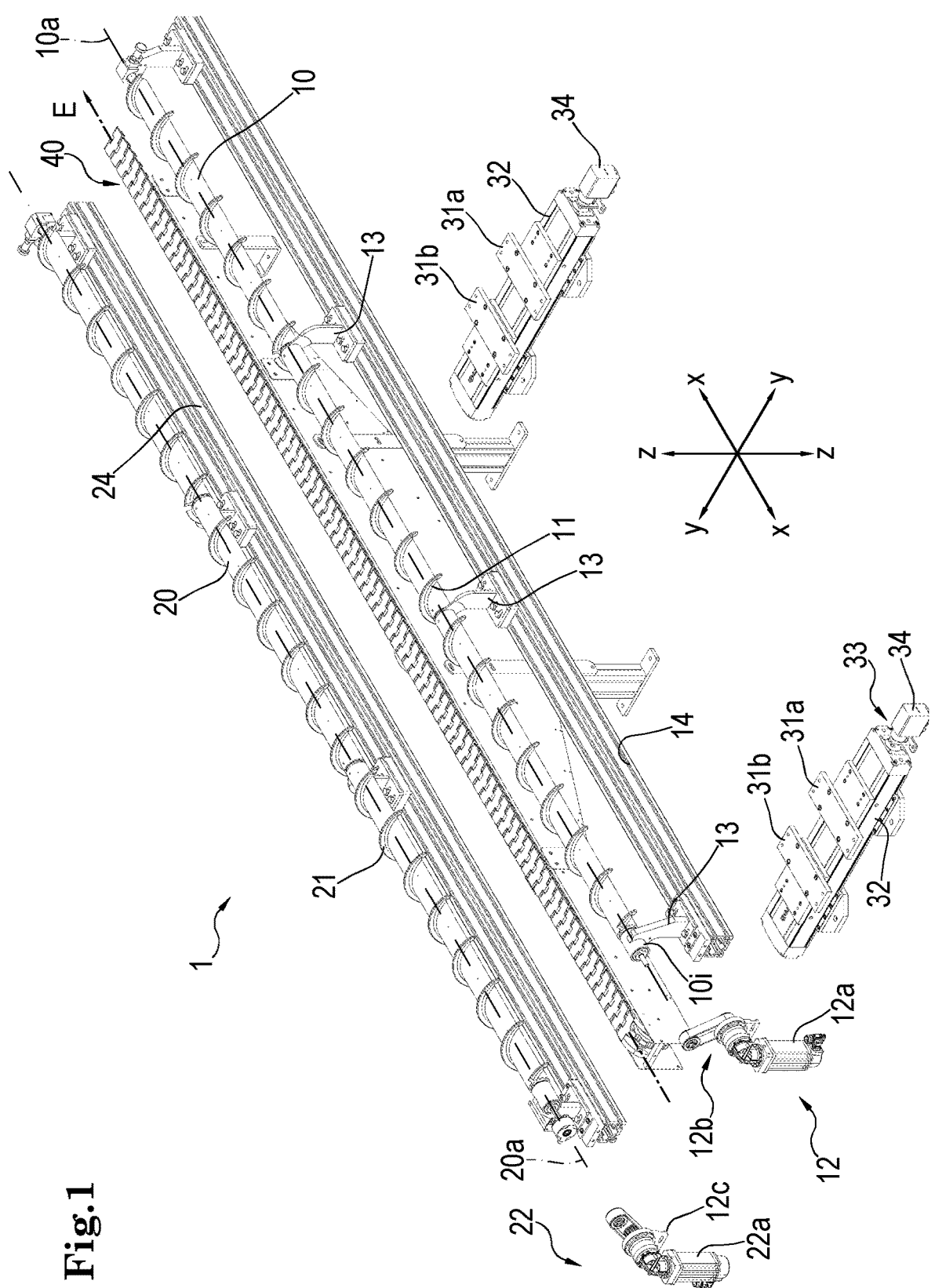
FIG. 1: shows an exploded perspective view of a first example of embodiment of the extraction system according to the present invention.
Figure 2:
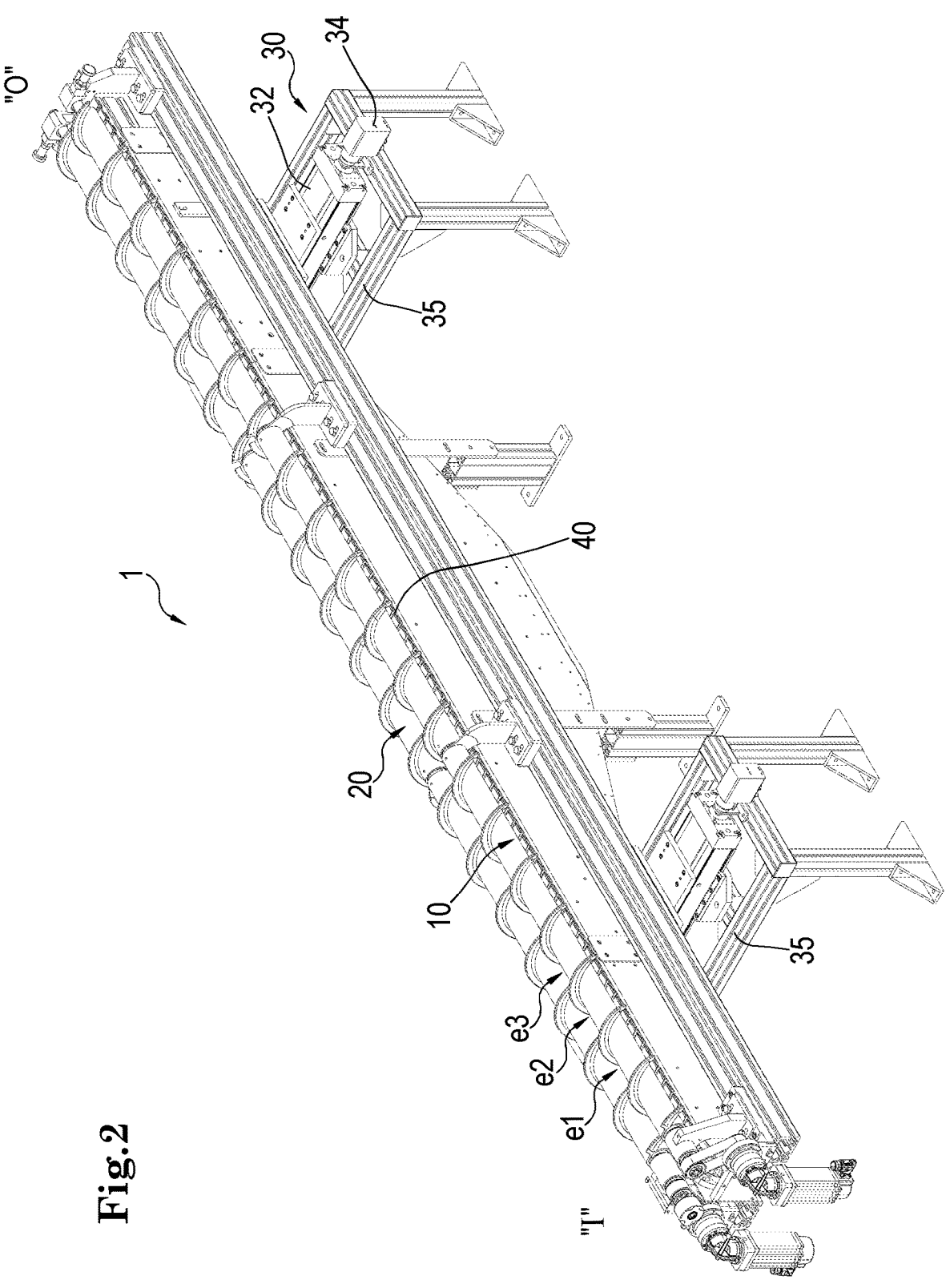
FIG. 2: shows a perspective view of the extraction system according to FIG. 1, in the assembled condition.

As shown in FIGS. 1, 2 and assuming solely for the sake of easier description and without a limiting meaning a set of three reference axes, in a longitudinal lengthwise direction X-X, parallel to a direction "E" of advancement/extraction of containers arranged orderly in-line in an extraction flow, a transverse direction widthwise direction Y-Y of the extraction system perpendicular to said advancing direction E, and a vertical heightwise direction Z-Z, perpendicular to the other two directions, as well as an upstream part "I" and a downstream part "O" for exit of the containers, a preferred example of an extraction system 1 for transporting an orderly flow of articles, such as containers 100, output from an unscrambling apparatus, comprises a support plane 40, which extends parallel to the longitudinal advancing direction E and to the transverse widthwise direction Y-Y and on which the articles rest and advance in said longitudinal advancing direction E, arranged in-line in an orderly flow, with a predefined pitch between successive articles and preferably with a predefined orientation and/or position.

A first helical screw 10 with longitudinal axis 10*a* parallel to the advancing direction E is arranged in a position above the support plane in the vertical heightwise direction Z-Z and with the longitudinal axis 10*a* axially offset in the transverse direction Y-Y with respect to the advancing direction E. The first helical screw 10 is set to rotate about its longitudinal axis 10*a*, being operated by rotational driving means 12.

A second helical screw 20 is arranged alongside the first screw 10 in a position above the support plane in the vertical heightwise direction Z-Z, with its longitudinal axis 20*a* parallel to the axis 10*a* of the first helical screw and axially offset in the transverse direction Y-Y with respect to the advancing direction E on the opposite side to the first helical screw 10. The second helical screw 1 is set to rotate about its longitudinal axis 20*a* at a speed synchronized with the rotation of the first helical screw and with a sense of rotation the same as the sense of rotation of the first helical screw 10, preferably upon operation of respective rotational driving means 22 independent of the operating means 12 of the first screw 10.

In the preferred example shown, each helical screw 10,20 is in particular in the form of an endless screw or auger with a cylindrical body and a threading 11,21 raised with respect to the cylindrical body.

Figure 3:
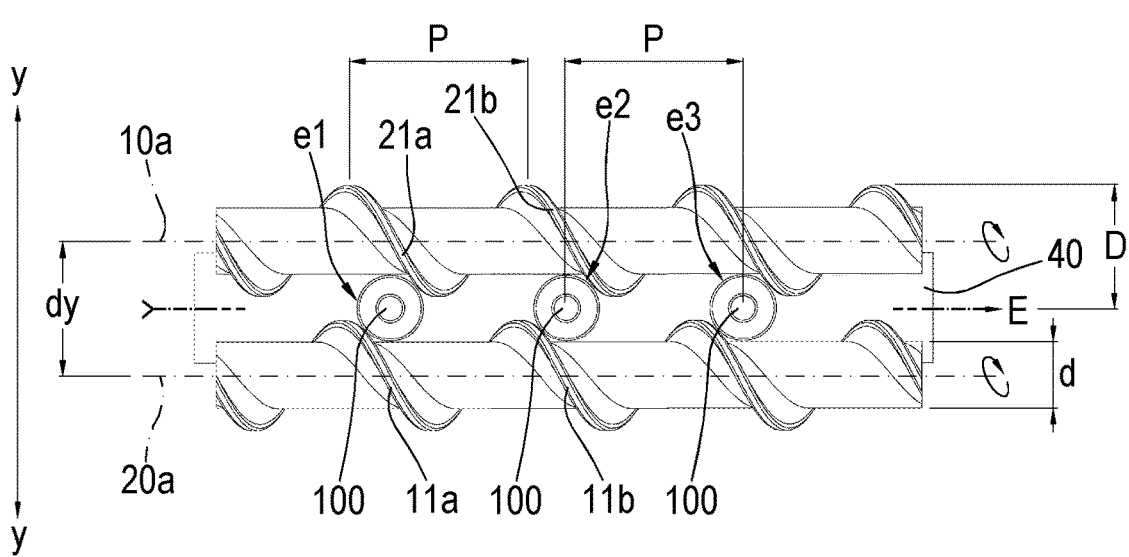
FIG. 3: shows a schematic view, from above, of the helical screws of the extraction system according to FIG. 1, which define containment spaces for containing and advancing a flow of orderly containers in sequence.
Figure 4:
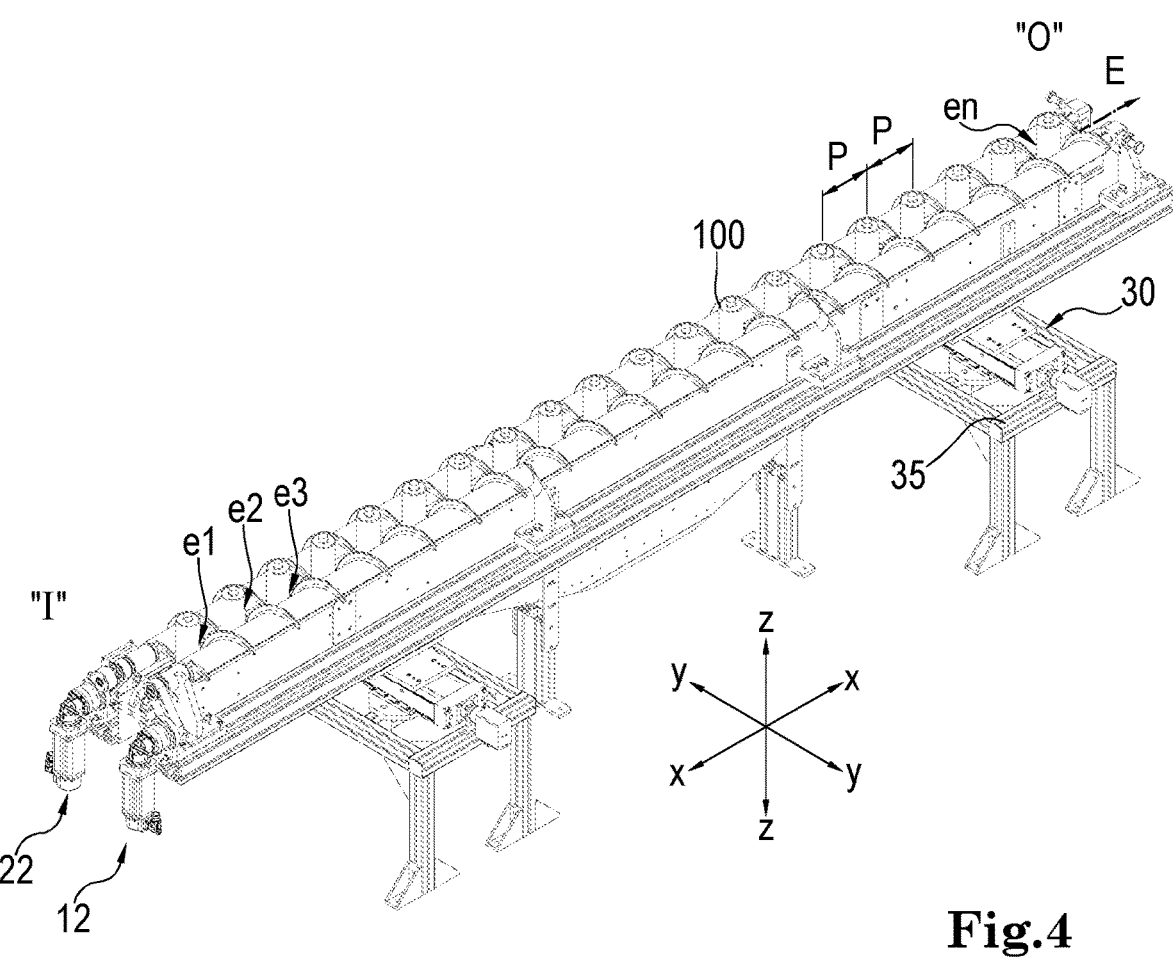
FIG. 4: shows a perspective view of the system according to FIG. 1, with an orderly flow of containers being extracted.

As shown in FIGS. 3 and 4, the geometry and the side-by-side arrangement of the helical screws 10,20 which rotate on parallel axes 10*a*,20*a* above the extraction plane 40 is such that a plurality of containment spaces e1,e2,e3 for containing and advancing an article 100 on the transport plane 40 are defined between the first helical screw 10 and the second helical screw 20, the containment spaces e1,e2,e3 being arranged in sequence in the longitudinal advancing direction E, so that a rotation through 360° of the helical screws 10,20 in the same sense allows the advancing movement of an article from one space e1 to the next space e2 in the advancing direction E, resulting in an orderly flow of articles 100 which advance arranged in-line in the extraction direction E with a desired advancing speed V1 determined by the speed of rotation of the screws 10,20.

In greater detail and with reference to FIG. 3, each containment and advancement space e1,e2,e3 is in particular defined in the space included between two crests 11*a*,21*a* adjacent in the transverse direction of the helical screws 10,20, the front and rear leading edges of which act on the container 100, allowing it to advance and keeping it in the predefined position and/or with the predefined orientation with which it was inserted inside the space.

The threads 11,21 of the two helical screws 10,20 have the same number of start threads, preferably a single start thread. In preferred embodiments, the two helical screws 10,20 are substantially identical and/or arranged at the same vertical height Z-Z above the support plane 40.

As can be seen, a transverse width of each containment space e1 is dependent on the interaxial distance dy between the axes 10*a*,20*a* of the screws 10,20 and optionally other factors such as the external diameter D and the internal diameter of each helical screw 10,20.

A pitch P between spaces e1,e2,e3 adjacent in the longitudinal direction is dependent on the pitch P of the thread 11,21 of the screws, namely the distance in the longitudinal direction X-X between two successive crests 11*a*,11*b* of a same screw 10 (arranged a same distance equal to a rotation through 360° along the helix).

The pitch P of the threads 11,21 of the two screws 10,20 is the same for the two screws 10,20 along their longitudinal direction, so that successive crests 11*a*,11*b* in the longitudinal direction X-X of the first screw 10 are arranged at the same distance P as the corresponding crests 21*a*,21*b* of the other screw 20, adjacent to them in the transverse direction Y-Y.

The pitch P of the screws 10, 20 is preferably constant so as to obtain a plurality of spaces e1,e2,e3 arranged in sequence with a constant pitch and therefore an orderly flow of articles 100 arranged in-line with a constant pitch P in the advancing direction E. It is, however, possible to design the helical screws 10 with a variable pitch in a corresponding manner for both the screws 10,20, for example so as to obtain a corresponding variation in the pitch between the containers deposited at the inlet into the containment spaces and the containers extracted at the outlet from the extraction system 1.

As will become clearer below, a longitudinal length of each containment and advancement space e1 is advantageously dependent on a phase difference Δφ between the helices of the two helical screws 10,20.

According to a preferred aspect of the invention, the means 12,22 for rotationally driving the helical screws 10,20 can be controlled and configured so as to adjust an initial phase of the helical thread 11,21 of the first and/or second screws, so as to adjust a phase difference Δφ between the helices of the two helical screws 10,20 in order to vary the longitudinal length of each containment space e1 for containing and advancing the articles.

As shown in FIGS. 1 and 2, in preferred embodiments, the means 12,22 for rotationally driving each helical screw 10,20 are of the electrical type, with a respective electric motor 12a,22a.

One or both the electrical drive systems 12a,22a are preferably configured to adjust an initial phase of the respective helical thread 11,21, for example by means of respective encoders and electronic control units. Therefore, it is possible to adjust a phase difference between the helical screws 10,20 and therefore a longitudinal dimension of the containment spaces e1,e2,e3 between the respective threads 11,21, for example by sending a corresponding command to the means 12,22 for rotationally driving one or both the screws 10,20.

In the example shown, the electric motors 12a,22a are coupled at an upstream end 10i of the respective screw 10,20 to a drive shaft, preferably parallel to the vertical direction Z-Z, and coupled via transmission means 12b to the said upstream end 10i. This configuration is particularly compact and advantageous in particular for use in unscrambling apparatus with a U-shaped conveyor belt for transporting the randomly arranged products.

With reference still to FIGS. 1 and 2, each helical screw 10,20 may be supported in cantilever fashion by a plurality of uprights 13 mounted on a respective longitudinal beam 14, 24 arranged externally in the transverse direction Y-Y with respect to the respective screw 10,20.

The means 12 for rotationally driving the screw 10 may be fixed to one end of said support beam 14 for example by means of a flange 12c.

The transmission means 12b may in this case include a first mechanism for transmission of the rotational movement of the vertical shaft of the motor 12a to a longitudinal axis rotor, and a second transmission, for example of the belt and pulley type, for transmission of the rotational movement to the helical screw 10. It will be clear to the person skilled in the art that there exist possible different configurations for generation and transmission of the rotational movement to the helical screws 10,20.

Advantageously, the support beam 14 for supporting the first screw 10 is fixed onto one or more respective sliders 31a which are displaceable in the transverse direction Y-Y on respective fixed linear guides 32, via means for performing displacement in the transverse direction Y-Y, for example comprising one or more electric motors 34, the transmission shaft of which operates an endless screw mechanism. Preferably the support beam 24 of the second screw 20 is in turn fixed onto one or more respective sliders 31b which are movable in the transverse direction on the same fixed guides 32 in a manner coordinated with the first sliders 31a, so that the helical screws 10,20 may be moved towards/away from each other in the transverse direction Y-Y in order to vary the interaxial distance dy between the screws.

This configuration forms a preferred example of embodiment of an assembly 30 for adjusting the interaxial distance dy between the helical screws 10,20, configured to displace in the transverse direction Y-Y one or both the helical screws 10,20 in order to vary the relative distance between said screws and consequently a transverse dimension of the spaces e1,e2,e3 for containing and advancing articles 100, defined between the screws. In particular, the assembly 30 for adjusting the interaxial distance dy between the helical screws 10,20 may comprise displacement means 33 designed to displace the support beam 14,24 of either one of or both the helical screws 10,20 in the transverse direction Y-Y.

Figure 5:
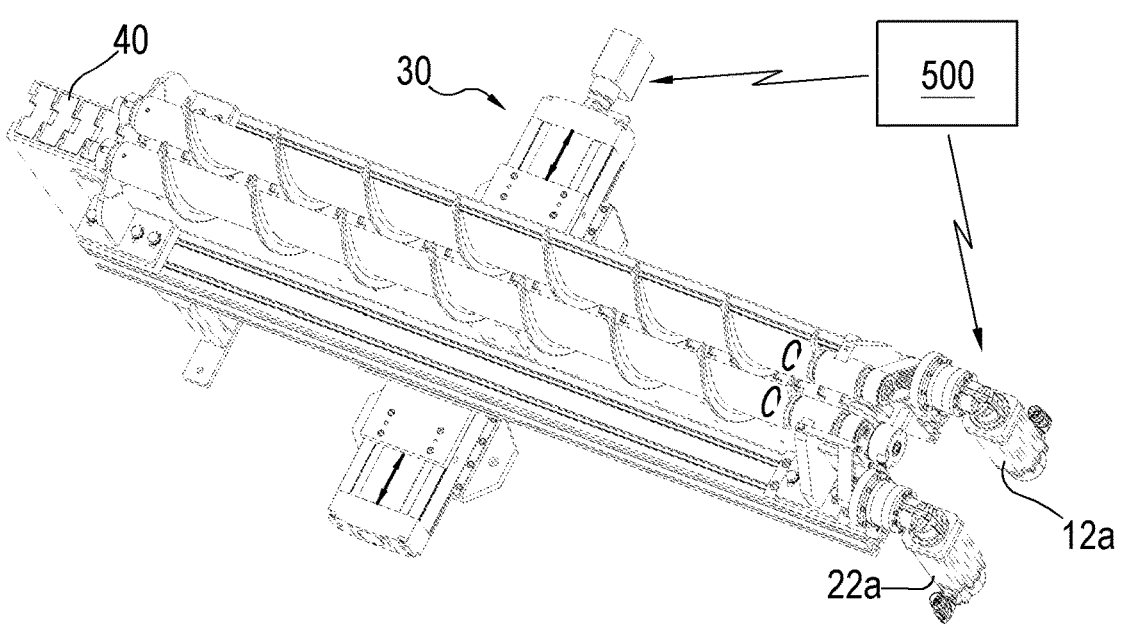
FIG. 5: shows a perspective elevation view of the system according to FIG. 1, with highlighted the adjustment drive systems for varying the spaces for containing the articles.
Figure 6:
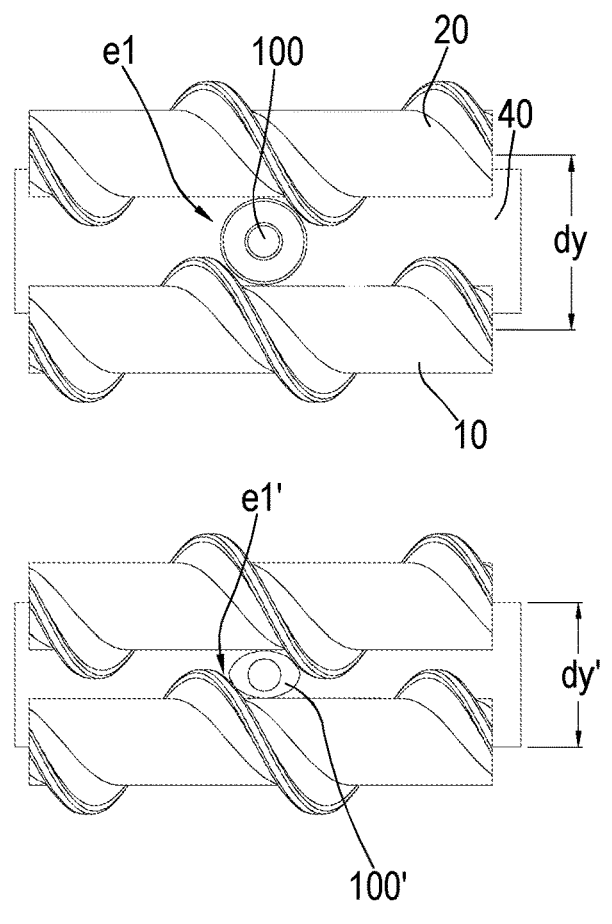
FIG. 6: shows a schematic view, from above, of a first example of variation of the containment spaces, by means of adjustment of the interaxial distance between the helical screws.

As shown in FIGS. 5 and 6, by varying the interaxial distance dy between the axes 10a,20a of rotation of the helical screws 10,20 it is in fact possible to adjust the transverse dimension of the spaces e1, obtaining spaces e1' which have dimensions suitable for containing and advancing articles 100' with a different shape and/or size of the transverse width.

Preferably, the assembly 30 for adjusting the interaxial distance dy between the screws 10,20 is configured to move symmetrically towards/away from each other both the screws 10,20 in the transverse direction Y-Y. This is particular advantageous for use as an extraction system in unscrambling apparatus since it allows the containment spaces e1,e2,e3 for the orderly flow of articles 100 to be kept aligned and centred in a predefined transverse position, in particular a central position, on the support plane 40, simplifying the operations for unscrambling and depositing the article 100.

Advantageously, the guides 32 for the displacement movement may be fixed (FIGS. 2,4) onto respective fixed bases 35 for supporting the screws 10,20.

Figure 7:
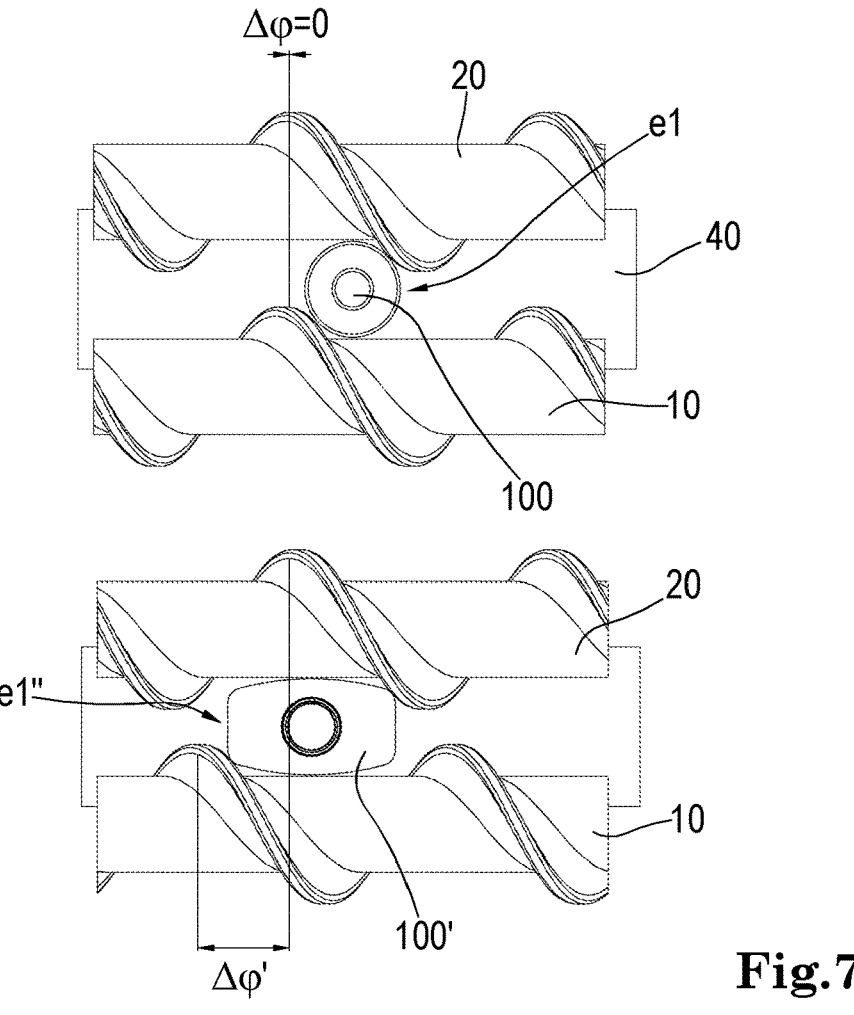
FIG. 7: shows a schematic view, from above, of a second example of variation of the containment spaces, by means of adjustment of a phase difference between the helical screws.

As shown in FIGS. 5 and 7, by varying the phase difference Δφ between the two helical screws 10,20, for example with an initial phase adjustment of one or both the screws 10,20 by means of the respective rotational driving means 12,22, it is possible to vary the longitudinal dimension of each space e1, which may be adjusted between a minimum dimension and a maximum dimension, for example corresponding respectively to a possible minimum and maximum phase difference between the two helical screws.

As shown in the example according to FIG. 7, a phase difference Δφ=0 may for example correspond to an average dimension in the longitudinal direction of the space e1 and by increasing the phase difference Δφ' between the helices 11,21 the longitudinal dimension of the seat e1" is increased proportionally, allowing housing of a container 100' which is bigger in the longitudinal direction.

Preferably, a minimum longitudinal dimension of each containment and advancement space e1, . . . ,en corresponds to a minimum phase difference Δφ, in particular to about Δφ=−180°, while a maximum longitudinal dimension corresponds to a maximum phase difference Δφ, in particular to about Δφ=+180°° (net of number of degrees dependent on the thickness of the crests of the threads).

It will be clear to the person skilled in the art that it is possible advantageously to combine an adjustment of the interaxial distance dy between the screws 10,20 with an adjustment of the phase difference Δφ between the helical screws, resulting in a high level of versatility with regard to the advancing and guiding containment of containers 100 with different formats and dimensions.

FIG. 5 moreover shows in schematic form a processing and control unit 500 for controlling and adjusting the system 1, connected to the means 12,22 for rotationally driving the screws 10,20 and to the assembly 30 for adjustment of the interaxial distance; this unit 500 may be for example the control unit of an unscrambling apparatus in which the extraction system 1 is incorporated for the orderly extraction of the articles.

According to preferred embodiments, the plane 40 for supporting the containers 100 may be a surface which can be made to advance in the longitudinal direction E of extraction of the articles, for example realized by a conveyor belt 40 operated by an associated actuator with a suitable movement coordinated with the rotational movement of the helical screws 10,20. With this configuration, the containment and advancement spaces e1, . . . ,en defined between the helical screws 10,20 perform mainly the function of containing the containers 100 which advance with a speed V1, transported by the conveyor belt 40 in the advancing direction, while keeping the containers aligned in an orderly manner and stable in a desired (upright) position and/or with a pre-defined orientation. Moreover, the screws 10,20 may allow the extraction of the containers 100 with a predefined pitch P, should this be desired, and compatible with the extraction speed V1 and the capacity of the unscrambling apparatus to fill the spaces e1, . . . , en.

Figure 8:
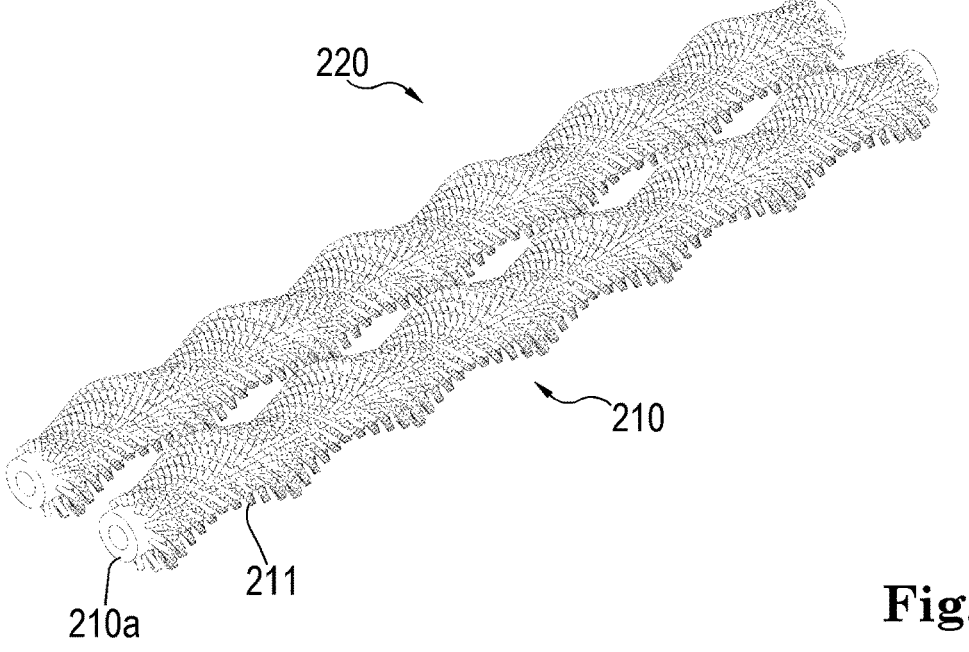
FIG. 8: shows a perspective view of a variation of an example of embodiment of the helical screws, with the helical threading formed by means of bristles.

With reference to FIG. 8, a variation of embodiment of a pair of helical screws 210,220 is advantageously realized by means of a plurality of bristles 211 fixed onto a central cylindrical body 210*a* of the respective screw 210 and arranged so as to define the helical surface desired for the screw 210.

The use of helical screws 210,220 with bristles 211 projecting from a central rotor ensures a certain flexibility and capacity to dampen the impacts on the containment and advancement spaces e1, allowing advantageously any imperfect insertion movements to be corrected, the containers 100 to be protected from damage, and also fragile containers 100 to be contained and guided during their advancing movement without damage thereto.

As shown in FIG. 2, each screw 10,209 may be composed of a plurality of screw sections which are joined together in the axial direction so that the extraction system may be adapted also after installation should a greater longitudinal length be required.

Furthermore, the support plane 40 may extend beyond the screws 10,20 in the longitudinal extraction direction E so as to allow any handling of the orderly flow of articles before they reach the following downstream machines.

Figure 9:
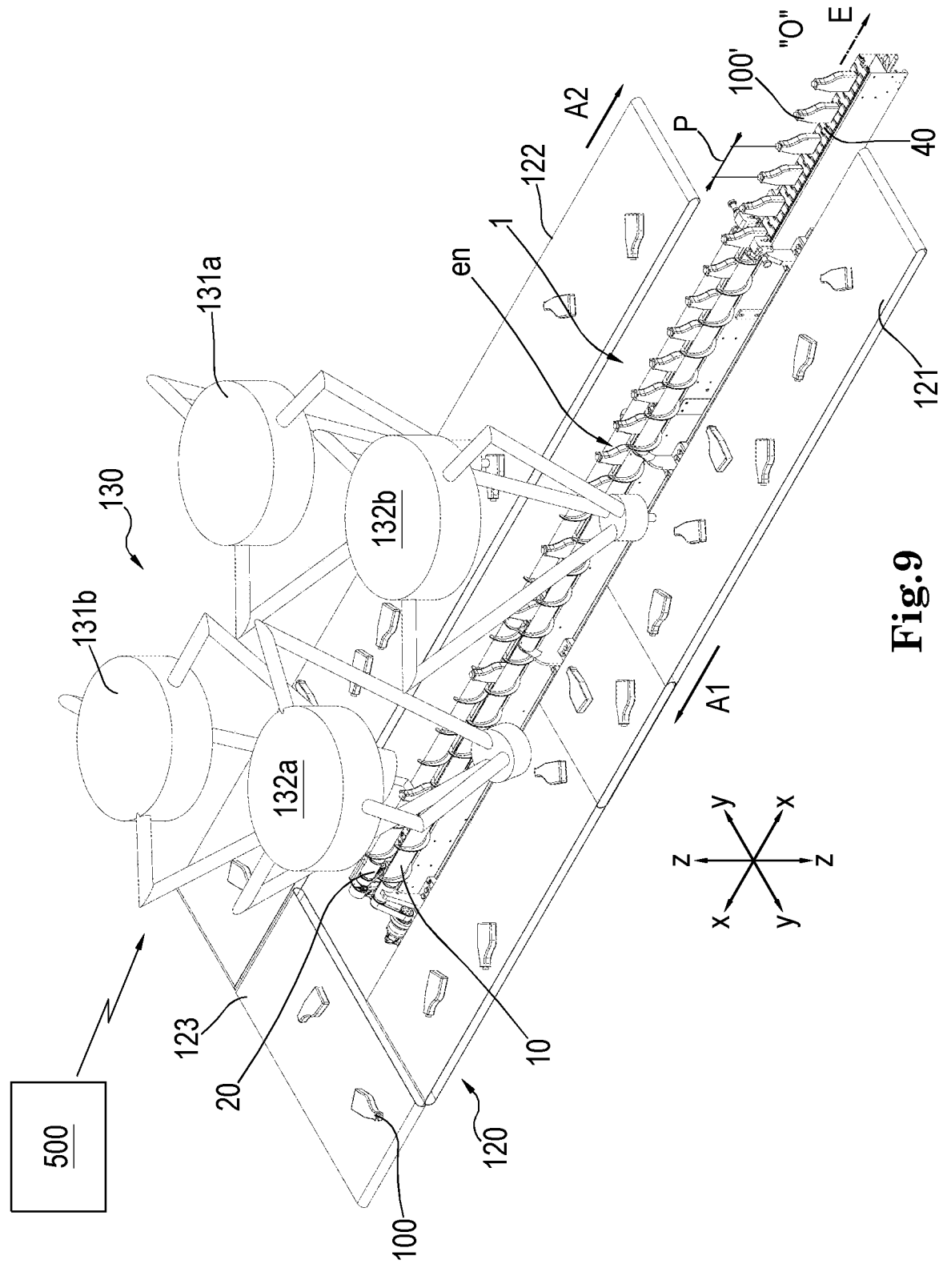
FIG. 9: shows an example of an unscrambling apparatus comprising an extraction system according to the invention.

With reference to FIG. 9, the operation of the extraction system 1 according to the invention in an apparatus for unscrambling randomly fed articles 100 is now described, said extraction system furthermore comprising a system for transporting through the apparatus containers 100 arranged randomly on a transport surface 120 and one or more devices 130 for gripping and positioning the articles 100, arranged and configured to pick up the articles arranged randomly on the transport surface 120 and position them on the extraction plane 40 in a containment and advancement space e1,e2, . . . . ,en of the extraction system 1, preferably with a predefined orientation (e.g. front face directed towards the outlet) and/or predefined position (upright position).

In the example shown, the transport surface 120 is formed by a conveyor belt 20 for supporting and transporting through the apparatus containers 100 randomly fed from an external device. Said transport surface 120 has preferably a substantially U-shaped configuration with a first outward section 121 and a second return section 122 connected together by a curved connecting section 123. The first section 121 moves along a first direction and advancing sense A1 and the second section 122 moves along a different direction A2, in the example parallel to and with a sense substantially opposite to the advancing direction A1 of the first outward section 121.

Preferred examples of embodiment of a U-shaped transport system are described in WO 2019082113 A1, WO 2019082111 A1 and WO 2019082112 A1, which are cited here as reference sources.

In preferred embodiments, the pick and place devices 130 comprise at least one robot 131 arranged opposite the first entry section 121 of the transport system, upstream of the curved section 123 and configured to pick up articles from the said first section 121, and at least one robot 132 arranged opposite the second return section 122 of the transport system, downstream of the curved section 123, and configured to pick up articles 100 from the said second section 122.

Preferred examples of embodiment of the pick and place devices for picking up articles from a transport surface and positioning them in an extraction system with a predefined orientation and/or position are described in WO 2019082113 A1, WO 2019082111 A1 and WO 2019082112 A1, cited here as reference sources.

As shown in FIG. 9, preferably a plurality of robots 131*a*,131*b*—two in the example shown—are associated with the first transport section, and/or a plurality of robots 132*a*,132*b*—two in the example shown—are associated with the second transport section.

Each robot may in particular be configured and controlled so as to operate on a respective designated (for example upstream or downstream) operating zone on the transport surface 120 and to position articles 100 inside a containment space comprised in a respective designated (for example upstream or downstream) zone and able to be reached for deposition in the extraction system 40.

The further robots 131,132 of each section 121,122 may be controlled in a manner coordinated with the first respective robots 31,21 also without varying the detection system and using the same cameras 61,62. Owing to the addition of further robots 131*b*,132*b* it is possible to obtain a further increase in the overall productivity of the apparatus, which may be close to the optimum productivity of 100% of the containers being correctly handled.

A detection system (not shown) is designed to detect the position and the arrangement of the articles 100 in transit on the transport system and to make available the information for controlling the pick and place devices.

This system may comprise for example one or more cameras, each arranged upstream of an associated robot 31,32 in the advancing direction A1,A2 and respectively able to detect the position and the arrangement of the containers 100 in transit on the transport surface within its field of vision, making the information available for controlling operation of the respective robot. Cameras of this type are known in the sector of unscrambling machines and are not described in greater detail.

The detection system may preferably comprise also means for measuring the advancing movement of one or more sections of the transport system, for example in the form of an encoder associated with the means for moving the belt 120.

The system 1 for extracting the containers 100 from the apparatus is designed to receive the containers released by the devices 130 in a free space e1 between the helical screws 10,20 and extract them from the apparatus along the extraction direction E, preferably arranged (100') with a predefined orientation and/or position which is generally dictated by the requirements of the operating machines situated downstream of the unscrambling machine.

As schematically shown in FIG. 9, the apparatus may also comprise a unit 500 for processing and controlling the components and the drives of the apparatus, for example configured to receive the detection signals made available by the detection system and consequently control the movement of the robots 31,32 for picking up the containers 100 from the transport system 20 and releasing them inside a free containment space of the system 1 and to adjust and control the operation of the helical screws 10,20 and the movable support surface 40 of the extraction system.

According to an example of embodiment, the processing and control unit 500 may process information regarding the state (full or empty) of a containment and advancement space and consequently control a pick and place device for the deposition of a picked-up container 100 in a free space. The information about the state of a space may in particular be processed on the basis of information relating to a space "en" filled by a pick and place robot and information relating to advancement of the flow of articles in the containment and advancing spaces "en", which may be combined with further set parameters for the flow output from the apparatus.

For example, the unit 500 may receive from the one or more pick and place robots 130 the indication that a given space "en" has been filled at a given moment. Moreover, the same processing unit 500 receives from the means for driving the helical screws information about the speed of rotation of the screws, on the basis of which an advancing speed of the flow of containers and a position thereof in the spaces arranged in sequence may be processed. By correlating this information, the processing unit may keep track of the containment spaces which are already filled and/or those which are free and therefore available, monitoring the state thereof over time, and consequently control the pick and place robots for deposition of the articles. According to a preferred embodiment, each pick and place device is configured and controlled to deposit a picked-up article 100 in a free recess "en" arranged inside a working zone of the extraction system designated to it and able to be reached for deposition therein.

Preferably, each pick and place robot is in particular configured and controlled to deposit an article 100 in the free space arranged further upstream in the extraction direction E, inside said zone designed to it. It is however possible to control the robots so that they deposit the article in a different free space in its working zone, for example the space which may be most easily reached from the article pick-up point on the transport surface 120.

A particularly advantageous embodiment of the unscrambling apparatus of the invention is that where the extraction system 1 comprises a support plane 40 for the containers released by the pick and place devices 130 which is arranged between the two sections of the U in an equidistant position from the first outward section 121 and from the second return section 122 of the transport system. This allows the configuration of a simplified system for management of the movements of the pick and place robots 130 associated with the respective first transport section 121 and second transport section 122, which robots therefore do not need to perform complicated and undesirable rotary translational movements with a long trajectory along multiple axes (in particular at least 3 axes), with a consequent simplification of the component parts and processing and control system of the unscrambling machine, as well as greater efficiency of the pick and place robots 130 and in general of the pick-up, unscrambling and deposition cycle.

Preferably, the extraction direction is parallel to and in the same sense as that of the second section 122 of the transport system. Preferably, the extraction plane 40 is coplanar with the transport plane 20.

In combination with these measures, by being able to adjust the phase difference between the screws independently of the interaxial distance and/or adjust the interaxial distance between the helical screws 10,20, moving them symmetrically towards/away from each other by means of the adjustment means 30, it is possible advantageously to maintain this simplicity in the configuration and the control of the pick and place devices 130 also when there is a variation in the format of the container and therefore the dimensions of the containment spaces e1, . . . ,en.

It will be clear to the person skilled in the art that the invention is not limited to apparatus with U-shaped transport surfaces and that the transport surface could for example be rectilinear, preferably arranged adjacent and parallel to the extraction plane 40.

In general, a curved section of the U-shaped transport system may cover an angle of approximately 180°, with advancing directions of the first outward section 21 and the second outward section 22 which are parallel and in the opposite sense; this configuration is optimum since it allows the overall dimensions of the apparatus to be kept small in the transverse direction Y-Y and the movements of the robots 31,32 to be simplified further, as well as the extraction system to be arranged so that the containers 100 oriented and/or positioned at the outlet of the apparatus advance, for example on the support plane 40, in a direction which is also parallel to the advancing directions A1,A2 of the first transport section 21 and second transport section 22. The apparatus according to the invention is, however, not strictly limited in this sense, it being possible to arrange the transport system in the form of a U which is more open, for example with a curve having an angle greater than 160°, and optionally arrange the extraction system so that the extraction/exit direction of the containers 100 extends along the line bisecting the angle of the curve 23, in this way maintaining the symmetry of movement of the robots 31 associated with the first section 21 and the robots 32 associated with the second transport section 22.

For unscrambling of the articles, in particular in the case of asymmetrical articles such as a container with an eccentric upper filling mouth, the apparatus may be advantageously configured so that the one or more robots 131a,131b for picking up the articles from the first transport section 121 is programmed to pick up only articles arranged on the first transport section 121, in particular only articles arranged with one or more predefined first orientations, and the at least one robot 132a,132b for picking up the articles from the second transport section 122 is programmed to pick up only articles arranged on the second transport section 122, in particular only articles arranged with one or more predefined orientations different from said one or more first orientations. This may, for example, be realized by configuring the apparatus so that the pick-up robot 131a of the first section 21 is controlled to pick up the containers which, arranged randomly on the first transport section 21, have a first side face 105a visible at the top and the robot 132a of the second section is controlled to pick up containers which have instead a second opposite side face visible at the top.

With this configuration and as shown in FIG. 9, the operating principle of the apparatus is as follows:

the containers 100 are fed randomly to the first section 21 of the transport belt 120;

advancing in the first advancing direction in the sense A1 they cross the field of vision of the detection system, which detects the position of the container on the said first belt 121, its arrangement (orientation) on the transport surface of the first section 121—for example defined by the orientation of the front and rear end faces and/or by the position of its side faces, which are respectively hidden, since resting on the belt 120, and visible at the top;

the information relating to the position and arrangement of the container 100 on the transport plane 120 is sent to a control unit 500 which, by correlating as required this information with the measurements of the belt advancing movement, commands the operation of a robot 131*a* along the first section 121, which is authorized to pick up, for example, only the containers which have a certain first orientation on the plane of the first transport belt 121, said orientation being associated for example with the presence of a first visible side surface, while allowing the other containers to pass by;

the first robot 131*a* picks up the selected containers and handles them so as to bring them into an upright position with the neck and filling opening positioned at the top and the front end face correctly directed in the predefined sense for extraction towards the outlet;

each picked-up container, once it has been correctly oriented, is released to the extraction system by the robot 131,131*b* which picked it up, depositing it on the extraction surface 40 inside a free containment space "en" defined between the screws 10,20 in the designated working zone of the robot;

rotation of the screws 10,20 and/or advancing of the extraction surface 40 cause advancing of the article 100 which is transported in a stable position in the direction E of extraction towards the exit;

continuing along the path defined by the conveyor belt 120, the containers 100 which are left travel along the curved section 123, reach the second section 121 of the "U" and, following reversal of the advancing direction A2, pass within the field of vision of a camera of the detection system, which detects the position and orientation thereof on the second section 122 of the "U";

most of the containers 100 detected on the second transport section 22 will now be formed by those containers, the orientation of which was different from (generally the opposite of) the first orientation which can be managed by the one or more robots 131*a*,131*b* of the first section. These containers 100, however, have changed the direction of their advancing movement after passing around the curved section 23 and therefore have an orientation which falls within a range of orientations which one of the second robots 132*a*,132*b* is able to manage with greater speed and precision;

the control unit 500 therefore authorizes a second robot 132*a* to pick up said containers 100 arranged with said second orientation;

the robot 132*a* picks up the containers 100 and handles them so as to bring them into an upright position with the filling neck positioned at the top and the front end face correctly directed in the same sense as the predefined extraction direction; and each container picked up by a robot 131*a* of the second section 122, once oriented correctly, is released to the extraction system, being deposited on the extraction plane 40 inside a free containment space "en" defined between the screws 10,20 in the designated working zone of the robot 132*a*, being joined together with the orderly flow of articles 100 arranged in-line in the extraction direction E, having been previously picked up, oriented and deposited by the other robots 131*a*, 131*b*.

At the exit O there is present, therefore, an orderly flow of articles 100' which are aligned in the extraction direction E, correctly oriented, in an upright position and preferably upright and preferably spaced with a desired pitch P between adjacent containers 100 determined by the pitch P between successive containment spaces.

As shown, the extraction plane 40 may extend in the longitudinal extraction direction beyond the downstream end of the helical screws 10,20, for the feeding of the flow of articles 100 arranged in-line to downstream apparatus such as apparatus for feeding them into a filling machine.

The orderly flow of articles 100' extracted at the outlet of the extraction system preferably has a constant pitch P, corresponding to 100% filling of the containment spaces "en" arranged in a downstream zone of the two screws 10,20.

The invention, however, is not limited in this sense: according to variations of embodiment a filling rate of the spaces "en" may be less than 100%, for example in the case of a desired pitch P for the orderly flow of articles 100' at the outlet, equal to a multiple of the pitch between the spaces "en".

In other variations of embodiment, it is possible to provide an accumulation system downstream of the extraction system 1, designed to accumulate the extracted containers 100 and feed them downstream with a different pitch between successive articles and/or different advancing speed. For this purpose, a speed V1 for exiting the extraction system 1 may be adjusted so as to be greater than a desired downstream speed of the accumulation system.

Varying the pitch P, namely the distance present between adjacent articles in the advancing/extraction direction, is advantageous during extraction towards the downstream operating machines which must be supplied with a specific pitch between successive articles, which varies from one machine to another. The apparatus may therefore be easily adapted also to production lines with pre-existing downstream operating machines.

Although described in connection with a number of embodiments and a number of preferred examples of implementation of the invention, it is understood that the scope of protection of the present patent is determined solely by the claims below.

The invention claimed is:

1. An extraction system for transporting in a longitudinal advancing direction (E) an orderly flow of articles (100), comprising:

a support plane (40), which extends parallel to the longitudinal advancing direction and to a transverse width-wise direction (Y-Y) and on which the articles (100) are supported so as to advance in said longitudinal advancing direction (E), arranged in-line in an orderly flow with a predefined orientation and/or position;

a first helical screw (10) with a longitudinal axis (10*a*) parallel to the advancing direction (E), arranged in a position above the support plane (40) in a vertical heightwise direction (Z-Z) and with its longitudinal axis (10*a*) axially offset in the transverse direction (Y-Y) with respect to the advancing direction, the first helical screw being set to rotate about its longitudinal axis (10*a*);

a second helical screw (20), with a longitudinal axis (20*a*) parallel to the axis (10*a*) of the first helical screw (10) and to the advancing direction (E);

wherein the second helical screw is arranged in a position above the support plane in the vertical heightwise direction (Z-Z) with its longitudinal axis (20*a*) axially offset in the transverse direction (Y-Y) on the opposite side to the first helical screw with respect to the advancing direction (E) and is set to rotate about its longitudinal axis with a speed which is synchronized with the rotation of the first helical screw and a same sense of rotation as the sense of rotation of the first helical screw, so that a plurality of containment spaces (e1,e2,e3, en) for containing and advancing an article on the support plane (40) are defined between the first helical screw and the second helical screw, the containment spaces (e1,e2, e3,en) being arranged in sequence in the longitudinal advancing direction (E) so that rotation of the two helical screws (10,20) allows the advancing of an article from one space to the next space in the advancing direction, resulting in the orderly flow of articles, and a first driving means (12) for rotationally driving the first helical screw (10);

a second driving means (22) for rotationally driving the second helical screw (20):

wherein the first driving means and the second driving means can be controlled and configured to adjust an initial phase of a helical threading (11,21) of the first helical screw and/or the second helical screw so as to adjust a phase difference (Δφ) between the helices of the two helical screws (10,20) in order to vary a longitudinal length of each containment and advancement space (e1).

2. The extraction system according to claim 1, wherein the threading (11,21) of the first and second helical screws (10,20) has the same number of start threads.

3. The extraction system according to claim 1, wherein pitches of the threading (11,21) of the first and second helical screws (10,20) correspond to each other along the longitudinal extension of the two screws (10,20), such that successive crests (11*a*,11*b*) in the longitudinal direction (X-X) of the threading of the first screw (10) are arranged at the same pitch distance (P) as the corresponding crests (21*a*,21*b*) of the other screw (20), adjacent to them in the transverse direction (Y-Y).

4. The extraction system according to claim 1, wherein pitch (P) of the helical screws (10,20) is constant along their longitudinal extension, so as to obtain a plurality of containment spaces (e1,e2,e3) arranged in sequence with a constant pitch in the advancing direction (E); or is variable in a corresponding manner for both screws (10,20).

5. The extraction system according to claim 1, wherein the driving means (12,22) for rotationally driving the first and second helical screw (10,20) comprise at least one electrical drive comprising a respective electric motor (12*a*,22*a*) for each of the helical screws (10,20).

6. The extraction system according to the claim 1, wherein the driving means for rotational driving the first and second helical screws (10,20) are coupled to an upstream end (10*i*) of the respective helical screw (10,20) and comprise a respective electric motor with a drive shaft parallel to the vertical direction (Z-Z), coupled via transmission means (12*b*) to the said upstream end (10*i*).

7. The extraction system according to claim 1, wherein the support plane (40) for the containers (100) is a movable plane advancing in the longitudinal direction (E) of extraction of the articles, having a movement coordinated with the rotational movement of the helical screws (10,20).

8. The extraction system according to claim 1, wherein each helical screw (10,20) is supported in cantilever fashion by a plurality of uprights (13) mounted on a respective longitudinal beam (14, 24) arranged in an external position in the transverse direction (Y-Y) with respect to the helical screw (10,20).

9. The extraction system according to claim 1, further comprising an assembly (30) for adjusting the interaxial distance (dy) between the helical screws (10,20), configured to displace in the transverse direction (Y-Y) one or both the helical screws (10,20) so as to vary the relative distance between the axes (10*a*,20*a*) of the helical screws in order to adjust a transverse dimension of the containment spaces (e1,e2,e3,en) for containing and advancing articles (100) defined between the screws.

10. The extraction system according to claim 9, wherein the assembly (30) for adjusting the interaxial distance (dy) between the helical screws (10,20) is configured to move symmetrically towards/away from each other both helical screws in the transverse direction (Y-Y).

11. The extraction system claim 9, wherein the assembly for adjusting the interaxial distance comprises, for one or both helical screws, one or more respective sliders (31*a*) displaceably integral with the respective screw and displaceable in the transverse direction (Y-Y) on respective fixed linear guides (32), by means of driving means (33) for performing the displacement in the transverse direction (Y-Y) arranged so as to displace the support beam (14,24) of one and/or the other helical screw in the transverse direction (Y-Y) so as to vary the interaxial distance (dy) between the screws.

12. The extraction system according to claim 1, wherein the helical screws are identical and/or are arranged symmetrically with respect to the extraction advancing direction (E) on opposite sides of the support plane (40).

13. The extraction system according to claim 1, further comprising a processing and control unit (500) for controlling and adjusting the extraction system (1) connected to the driving means (12,22) for rotationally driving the helical screws (10,20) and/or to the assembly (30) for adjusting the interaxial distance.

14. The extraction system according to claim 1, wherein the helical screws (210,220) each comprise a plurality of bristles (211) fixed on a central cylindrical body (210*a*) of the screw (210) and arranged so as to define the helical surface of the helical screw (210).

15. An apparatus for unscrambling articles (100), fed randomly to an inlet thereof, comprising:

a transport system (12) for transporting the articles being fed in, designed to transport the articles arranged randomly on a transport surface;

an extraction system (1) according to claim 1, for transporting in an advancing direction (E) the articles (100) arranged in-line in an orderly flow with a predefined orientation and/or position;

one or more pick and place devices (130) for picking and positioning the articles (100), configured to pick up the articles arranged randomly on the transport system (120) and deposit them in a free containment and advancement space (e1,e2,e3,en) of the extraction system (1) with a predefined orientation and/or position.

16. The apparatus according to claim 15, further comprising:

a detection system for detecting the position and the arrangement of the articles (100) in transit on the transport system and for making available the information for controlling the pick and place devices (130);

a processing and control unit (500) for processing and controlling the components and drive systems of the apparatus, designed to receive the information about the position and/or arrangement of the articles, to control the one or more pick and place devices (130) and to adjust and control the operation of the extraction system (1).

17. The apparatus according to claim 15, wherein the transport system (120) has a substantially U-shaped extension with a first outward section (121) configured to transport the articles in a first advancing direction (A1) and a second exit section (122) configured to transport the containers in a second advancing direction (A2) different from the first direction (A1), the two sections (121;122) being connected by a curved section (123).

18. The apparatus according to claim 17, wherein the pick and place devices (130) comprise at least one robot (131*a*, 131*b*) arranged upstream of the curved section (123), opposite the first section (121) of the transport system, configured to pick up articles from the first section (121) of the transport system, and at least one robot (132*a*,132*b*) arranged downstream of the curved section, opposite the second exit section (122), and configured to pick up articles (100) from the second exit section (122) of the transport system (120).

19. The apparatus according to claim 18, wherein the apparatus is configured so that the at least one robot (131*a*, 131*b*) for picking up articles from the first section (121) of the transport system picks up only articles arranged on said first section, being only the articles arranged with one or more predefined orientations; and that the at least one robot (32) for picking up articles from the second section (22) of the transport system picks up only articles arranged on said second transport section, being only the articles arranged with one or more predefined second orientations, different from the one or more first orientations.

20. The apparatus according claim 17, wherein the advancing direction (A2) of the second exit section (122) is parallel to and has a sense substantially opposite to the advancing direction (A1) of the first outward section (121).

21. The apparatus according to claim 17, wherein the support plane (40) for the articles is arranged between the first outward section (121) and the second exit section (122) of the transport system equidistant from the first outward section (121) and from the second exit section (122) of the transport system arranged along a bisector of an angle followed by the curved section (123) connecting together outward and return sections of the transport system.

22. The apparatus according to claim 15, wherein the support plane of the extraction system is arranged parallel to and/or coplanar with a section of the transport plane of the transport system; wherein the extraction direction along the support plane (40) of the extraction system is parallel to and in the same sense as the advancing direction (A2) of the second exit section (122).

23. The apparatus according to claim 15, wherein each pick and place device is configured and controlled to deposit a picked-up article (100) in a free containment space (en) arranged within a working zone of the extraction system designated to it and reachable for deposition therein.

24. The apparatus according to claim 23, wherein one or more of the pick and place devices is configured and controlled to deposit an article (100) in the free containment and advancement space (en) arranged furthest upstream in the extraction direction (E) within said working zone designated to it.

25. A method for unscrambling articles (100), which are randomly fed, comprising the steps of:

randomly feeding articles to a transport system (120), with transporting of the articles arranged randomly on a transport surface;

picking up one or more of the articles arranged randomly on the transport system (120) by means of one or more pick and place devices (131*a*,131*b*;132*a*,132*b*) for picking up and positioning the articles (100), releasing each picked-up article to an extraction system (1) according to one of claim 1, wherein the article (100) is deposited by the pick and place device on the extraction plane (40) inside a free containment and advancement space (en) defined between the helical screws (10,20);

extracting the articles (100) which advance in the longitudinal advancing direction (E) arranged in-line in an orderly flow with a predefined orientation and/or position, wherein the helical screws (10;20) are rotationally driven with the same sense and with the same speed of rotation, allowing advancing of each article from one containment space to the next space in the advancing direction (E).

26. The method for unscrambling articles according to claim 25, further comprising adjusting a transverse dimension of the containment and advancement spaces, by adjusting an interaxial distance between the helical screws, and/or adjusting a longitudinal dimension of the containment and advancement spaces by adjusting a phase difference between the helical screws by the first driving means for rotationally driving the first helical screw and the second driving means for rotationally driving the second helical screw, controlled so as to adjust the initial phase of the helical threading (11,21) of the first and/or second screws.

27. The method according to claim 26, wherein the extracted articles advance in the advancing direction (E) with a constant pitch (P) between successive articles.

28. The method according to claim 25, wherein one or more of the pick and place devices is configured and controlled to deposit an article (100) in the free containment and advancement space (en) arranged furthest upstream in the extraction direction (E) within a working zone designated to it.

29. The method for unscrambling articles according to claim 25, wherein, for the extraction of the articles, the support plane (40) for the containers (100) is made to advance in the longitudinal extraction direction (E), with a movement coordinated with the rotational movement of the helical screws (10,20).

30. The method for unscrambling articles according to claim 25, wherein the release and/or extraction of the articles is performed onto and/or along an extraction plane (40) equidistant from a first outward section (121) and from the second eixt section (122) of the transport system arranged along a bisector of an angle spanned by a curved section (123) connecting the first and second sections and/or wherein the extraction direction along the support plane (40) of the extraction system is parallel to and has a same sense as the advancing direction (A2) of the second exit section (122).

* * * * *